(12) United States Patent
Cakulev et al.

(10) Patent No.: US 8,644,510 B2
(45) Date of Patent: Feb. 4, 2014

(54) DISCOVERY OF SECURITY ASSOCIATIONS FOR KEY MANAGEMENT RELYING ON PUBLIC KEYS

(75) Inventors: Violeta Cakulev, Millburn, NJ (US); Semyon B. Mizikovsky, Morganville, NJ (US)

(73) Assignee: Alcatel Lucent, Paris (FR)

(*) Notice: Subject to any disclaimer, the term of this patent is extended or adjusted under 35 U.S.C. 154(b) by 194 days.

(21) Appl. No.: 13/173,079

(22) Filed: Jun. 30, 2011

(65) Prior Publication Data

US 2012/0288092 A1 Nov. 15, 2012

Related U.S. Application Data

(60) Provisional application No. 61/484,868, filed on May 11, 2011.

(51) Int. Cl.
*H04L 9/00* (2006.01)
(52) U.S. Cl.
USPC .......................................... 380/255; 380/286
(58) Field of Classification Search
USPC ............................ 380/255, 286; 713/150–182
See application file for complete search history.

(56) References Cited

U.S. PATENT DOCUMENTS

| | | | |
|---|---|---|---|
| 5,640,454 A | 6/1997 | Lipner et al. | |
| 6,058,188 A | 5/2000 | Chandersekaran et al. | |
| 2008/0240433 A1* | 10/2008 | Fahn et al. | 380/255 |
| 2008/0292105 A1* | 11/2008 | Wan et al. | 380/282 |
| 2010/0027520 A1* | 2/2010 | Yao et al. | 370/338 |
| 2010/0211779 A1* | 8/2010 | Sundaram | 713/168 |
| 2011/0051912 A1* | 3/2011 | Sundaram et al. | 379/93.02 |
| 2011/0055561 A1* | 3/2011 | Lai et al. | 713/168 |
| 2011/0055567 A1* | 3/2011 | Sundaram et al. | 713/169 |
| 2011/0153809 A1 | 6/2011 | Ghanem et al. | |

FOREIGN PATENT DOCUMENTS

WO PCT/US2012/035355 7/2012

OTHER PUBLICATIONS

Skype reference, www.skype.com, 7 pages.
F. Andreasen et al., "Session Description Protocol (SDP) Security Descriptions for Media Streams," Network Working Group, Request for Comments: 4568, Jul. 2006, 44 pages.

(Continued)

*Primary Examiner* — Matthew Smithers
(74) *Attorney, Agent, or Firm* — Ryan, Mason & Lewis, LLP

(57) ABSTRACT

Techniques are disclosed for forming a discoverable security association in communication environments and for lawfully discovering security associations formed in communication environments. For example, a method for forming a discoverable security association between a first computing device and a second computing device comprises the following steps. The first computing device obtains from a key management entity: (i) a first private key assigned to the first computing device, which is computationally associative with a first public key associated with the first computing device; and (ii) a first root key assigned to the first computing device. The first computing device chooses a first random value and generating a first nonce, wherein the first nonce is a result of an encryption of the first random value using the first root key. The first computing device generates a first key component based on the first random value. The first computing device encrypts the first nonce and the first key component with a second public key associated with the second computing device using an identity-based encryption process and sends the encrypted first nonce and the encrypted first key component to the second computing device so as to establish a security association with the second computing device. The security association is discoverable by a third computing device unbeknownst to the first computing device and the second computing device.

26 Claims, 6 Drawing Sheets

(56) References Cited

OTHER PUBLICATIONS

C. Neuman et al., "The Kerberos Network Authentication Service (V5)," Network Working Group, Request for Comments: 4120, Jul. 2005, 138 pages.

J. Mattsson et al., "MIKEY-Ticket: Ticket-Based Modes of Key Distribution in Multimedia Internet KEYing (MIKEY)," Internet Engineering Task Force (IETF), Request for Comments: 6043, Mar. 2011, 58 pages.

M. Bellare et al., "Entity Authentication and Key Distribution," Proceedings of the 13th Annual International Cryptology Conference on Advances in Cryptology, Lecture Notes in Computer Science, 1994, 29 pages, vol. 773.

T. Dierks et al., "The TLS Protocol Version 1.0," Network Working Group, Request for Comments: 2246, Jan. 1999, 80 pages.

V. Cakulev et al., "IBAKE: Identity-Based Authenticated Key Exchange," Internet-Draft (IETF), Apr. 2011, 17 pages.

V. Kolesnikov et al., "Hybrid Identity Based Authenticated Key Exchange Protocols," Bell Labs Technical Memorandum, 2011, 13 pages.

E. Rescorla, "Diffie-Hellman Key Agreement Method," Network Working Group, Request for Comments: 2631, Jun. 1999, 13 pages.

W. Diffie et al., "New Directions in Cryptography," IEEE Transactions on Information Theory, Nov. 1976, pp. 644-654, vol. 22, No. 6.

G. Appenzeller et al., "Identity-Based Encryption Architecture and Supporting Data Structures," Network Working Group, Request for Comments: 5408, Jan. 2009, 30 pages.

M. Burmester et al., "A Secure and Efficient Conference Key Distribution System," Proceedings of Eurocrypt, Advances in Cryptology, Lecture Notes in Computer Science, 1994, pp. 275-286, vol. 950.

D. Boneh et al., "Identity-Based Encryption from the Weil Pairing," Proceedings of Crypto, Lecture Notes in Computer Science, 2001, pp. 213-229, vol. 2139.

T. Dierks et al., "The Transport Layer Security (TLS) Protocol Version 1.1," Network Working Group, Request for Comments: 4346, Apr. 2006, 87 pages.

T. Dierks et al., "The Transport Layer Security (TLS) Protocol Version 1.2," Network Working Group, Request for Comments: 5246, Aug. 2008, 104 pages.

L. Martin et al., "Using the Boneh-Franklin and Boneh-Boyen Identity-Based Encryption Algorithms with the Cryptographic Message Syntax (CMS)," Network Working Group, Request for Comments: 5409, Jan. 2009, 13 pages.

"FIPS Publication 180-1—Federal Information Processing Standards Publication," U.S. Department of Commerce/National Institute of Standards and Technology, Secure Hash Standard, Apr. 1995, 24 pages.

D. Eastlake, 3rd et al., "US Secure Hash Algorithm 1 (SHA1)," Network Working Group, Request for Comments: 3174, Sep. 2001, 22 pages.

U.S. Appl. No. 13/097,184 filed in the name of Sundaram et al. on Apr. 29, 2011 and entitled "Discovery of Security Associations."

\* cited by examiner

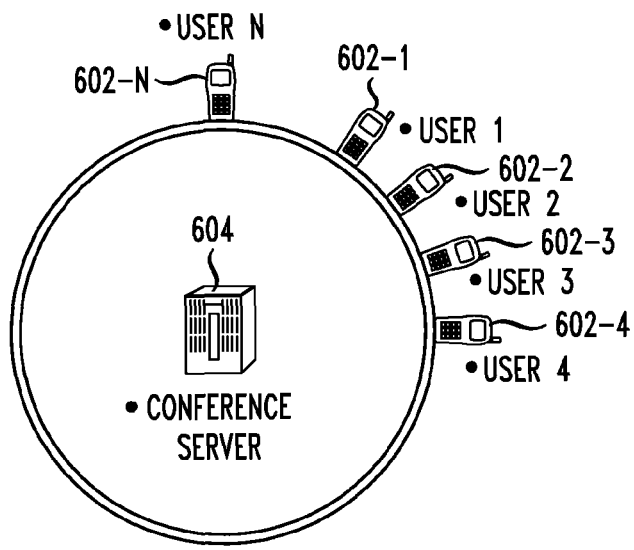

- GROUP KEY = $Na_i(Z_{i-1}) + (N-1)X_i + (N-2)X_{i+1} + .... + X_{i-2}$

- GROUP KEY NOT KNOWN TO THE CONFERENCE SERVER

USERS CORRESPOND WITH CONFERENCE SERVER DURING KEY EXCHANGE
- EACH USER INDIVIDUALLY EXECUTES IBAKE WITH CONFERENCE SERVER
  - LET $Z_i = a_i P$ BE THE VALUE SENT BY USER "i" TO SERVER DURING AUTHENTICATION WITH SERVER
- AFTER AUTHENTICATION SUCCESS
  - CONFERENCE SERVER SENDS THE SET $\{a_i P\}$ TO EVERYBODY (EITHER BROADCAST OR INDIVIDUAL UNICAST)
  - EVERY USER INDIVIDUALLY SENDS BACK $Xi = a_i(a_{i+1}P - a_{i-1}P)$ TO THE SERVER

606

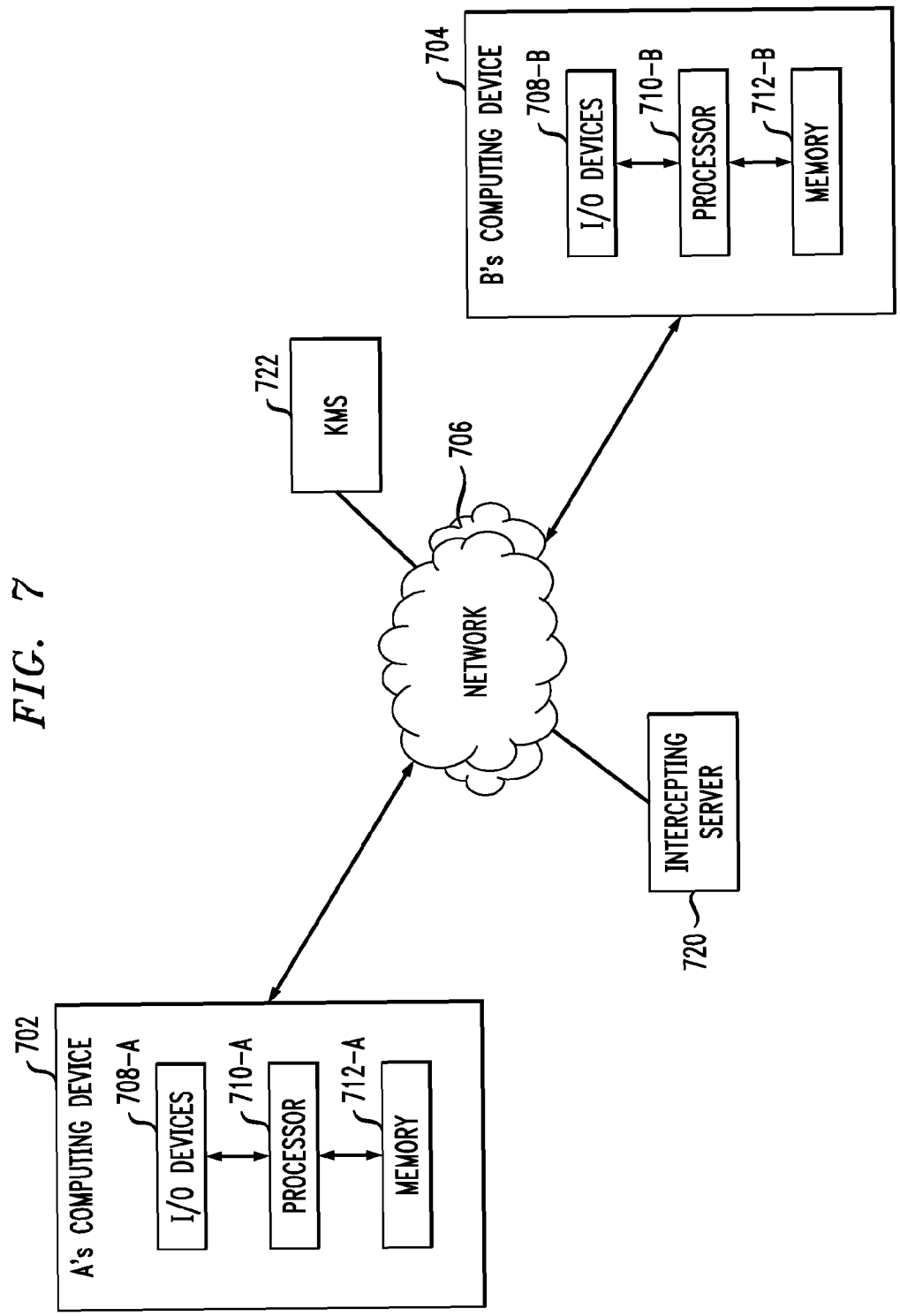

DISCOVERY OF SECURITY ASSOCIATIONS FOR KEY MANAGEMENT RELYING ON PUBLIC KEYS

The present application claims priority to the U.S. provisional patent application identified as Ser. No. 61/484,868, filed on May 11, 2011, and entitled "Lawful Interception Method for Key Management Schemes Relying on Public Keys," the disclosure of which is incorporated by reference herein in its entirety.

FIELD OF THE INVENTION

Embodiments relate generally to communication security and, more particularly, to techniques for discovering security associations in communication environments for use in lawful interception of information.

BACKGROUND OF THE INVENTION

Internet Protocol (IP) communications and telephony systems have gained wide spread adoption. One of the first examples of end-to-end IP communications between two clients included Instant Messaging, but this was soon followed by Voice-over-IP and now many providers (e.g., network operators and application providers) offer end-to-end Video-over-IP. However, these trends were largely restricted to wired fixed networks, given that wireless mobile network access has been dominated by narrow-band circuit switched access networks. However, the recent deployment of broadband 4G (fourth generation) wireless networks sets the stage for all forms of multimedia over IP communications end-to-end, independent of access type.

With the transition towards end-to-end IP sessions, the market has witnessed a resurgence in interest as well as an awareness for security and privacy over these open IP networks. As a first step, end-to-end encryption and authentication are paradigms that are gaining wide attention. While contemporary Internet transactions involving commerce and Enterprise Intranet access have been secured end-to-end for over a decade now, securing conversational applications over IP have been largely left to the application provider, e.g., SKYPE™ (trademark of Skype Technologies S.A. of Luxembourg).

With the advent of all-IP networks, it is becoming increasingly necessary for network operators or others who offer voice, video, and messaging services to provide security end-to-end while complying with requirements to support lawful or legal interception and discovery of security associations. Such legal interception and discovery of security associations may be necessary for law enforcement purposes, or simply for some non-law enforcement purpose, whereby it is necessary or desirable to be able to decrypt encrypted information transmitted between parties and/or devices.

SUMMARY OF THE INVENTION

Example embodiments provide techniques for forming a discoverable security association in communication environments, and techniques for lawfully discovering security associations formed in communication environments.

For example, in one example embodiment, a method for forming a discoverable security association between a first computing device and a second computing device comprises the following steps. The first computing device obtains from a key management entity: (i) a first private key assigned to the first computing device, which is computationally associative with a first public key associated with the first computing device; and (ii) a first root key assigned to the first computing device. The first computing device chooses a first random value and generating a first nonce, wherein the first nonce is a result of an encryption of the first random value using the first root key. The first computing device generates a first key component based on the first random value. The first computing device encrypts the first nonce and the first key component with a second public key associated with the second computing device using an identity-based encryption process and sends the encrypted first nonce and the encrypted first key component to the second computing device so as to establish a security association with the second computing device, wherein the security association is discoverable by a third computing device unbeknownst to the first computing device and the second computing device.

In another example embodiment, a method for discovering a security association formed between a first computing device and a second computing device comprises the following steps. A third computing device obtains one or more messages transmitted between the first computing device and the second computing device. The third computing device, with knowledge of a private key associated with the second computing device, decrypts at least one of the one or more obtained messages from the first computing device and obtaining: (i) a first key component generated by the first computing device; and (ii) a nonce generated by the second computing device, the nonce being a result of an encryption of a random value chosen by the second computing device, the encryption using a root key uniquely assigned to the second computing device. The third computing device, with knowledge of the root key of the second computing device, decrypts the nonce to obtain the random value chosen by the second computing device. The third computing device, with knowledge of the random value chosen by the second computing device and the first key component generated by the first computing device, discovers a security association established between the first computing device and the second computing device unbeknownst to the first computing device and the second computing device.

Furthermore, example embodiments provide methodologies to lawfully discover security associations, including but not limited to keys and other cryptographic data, for end-to-end encrypted sessions, using techniques that are particularly applicable to, but not limited to, systems that rely on public key methods for key management. For example, embodiments may be used in accordance with systems and protocols that implement an asymmetric mutually authenticated key exchange and/or any Diffie-Hellman based key exchange. In particular, the proposed overlay procedure is undetectable while satisfying various compliance requirements. It is to be appreciated that while embodiments are particularly suitable to an Internet Protocol Multimedia Subsystem (IMS) environment, such embodiments are not intended to be so limited. That is, embodiments are generally applicable to any suitable communication system in which it is desirable to provide lawful security association discovery features. By way of example only, another communication system in which such techniques may be applied is a conference calling system based on an IMS signaling framework or any other signaling framework.

These and other objects, features and advantages will become apparent from the following detailed description of illustrative embodiments thereof, which is to be read in connection with the accompanying drawings.

BRIEF DESCRIPTION OF THE DRAWINGS

FIG. 6 illustrates a methodology for lawful discovery of session keys involving nonce exchange in a conference calling environment according to an embodiment.

FIG. 7 illustrates a generalized hardware architecture of a data network and communication (computing) devices suitable for implementing one or more of the methodologies and protocols according to embodiments.

DETAILED DESCRIPTION OF PREFERRED EMBODIMENTS

Figure 1:
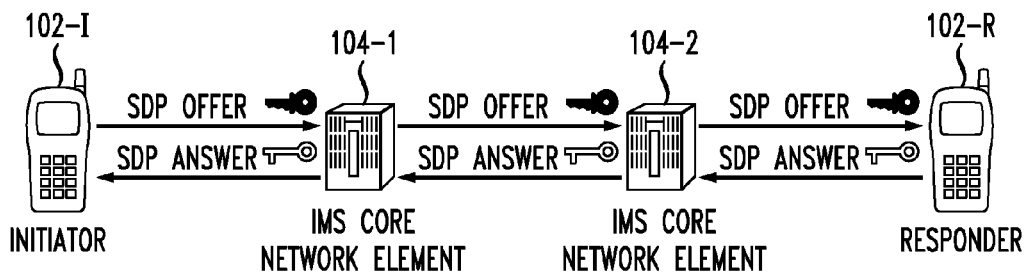
FIG. 1 illustrates a client based key transfer methodology.

The phrase "multimedia communication system" as used herein is generally defined as any communication system capable of transporting, over a media plane, one or more types of media involving, but not limited to, text-based data, graphics-based data, voice-based data and video-based data.

The phrase "media plane" as used herein is generally defined as the functional portion of the multimedia communication system in accordance with which the one or more types of media are exchanged between two or more parties in a call session. This is in contrast with a "control plane" which is the functional portion of the multimedia communication system in accordance with which call negotiation/scheduling is performed in order to establish the call session. Examples of media plane applications with which the inventive techniques can be used include, but are not limited to, Voice-over-IP (VoIP), Instant Messaging (IM), Video/Audio IM, Video Share, and Video-over-IP. It is understood that the media plane contains application layer traffic. However, the lawful security association discovery techniques described herein can be applied to any plane or layer of a communication system.

The term "key" as used herein is generally defined as an input to a cryptographic protocol, for purposes such as, but not limited to, entity authentication, privacy, message integrity, etc.

The phrase "security association" as used herein generally refers to a security definition in a communication environment across which two or more parties and/or devices communicate. In one example, the security definition may include, but is not limited to, a session key.

A "client" as used herein may generally refer to a communication device or some other computing system or device that allows one or more users, parties or entities to communicate in a communication environment with one or more other communication devices or other computing systems, such as another client. A "client" as used herein may also generally refer to an application or other computer program on a computing device. Thus, while the term client may be referred to below as a device, it is to be understood that the term client is not limited to hardware but may be software, or a combination thereof.

A "communication session" as used herein generally refers to a connection between at least two communication devices or other computing systems (e.g., clients) for the purpose of communication between the two devices. Thus, an "end-to-end" communication session as used herein generally refers to the entire connection path from one device (e.g., client) to the other device (e.g., client). Also, the two or more clients that are participating in the communication session are referred to as "end-point devices" or simple "end-points." However, the lawful security association discovery techniques described herein can be applied to any computing or communication device, and not just to a client.

An "application" (or "application program") as used herein generally refers to one or more computer programs which, when executed, perform one or more given functions.

The term "lawful" as used herein is generally defined as satisfying one or more compliance requirements or guidelines associated with a governmental or private authoritative entity. Such authoritative entity may serve a law enforcement function or a non-law enforcement function. That is, the term lawful is not intended to be limited to law enforcement but rather may also include compliance in a non-law enforcement sense.

For ease of reference, the detailed description is divided as follows. Section I describes illustrative use cases and providers for which example embodiments may be applied. Section II describes existing end-to-end key management methodologies. Section III describes existing key resolution methodologies. Section IV describes lawful security association discovery solutions according to example embodiments in an Internet Protocol (IP) Multimedia Subsystem (IMS) environment context. Section V describes an illustrative computing system for implementing one or more lawful security association discovery methodologies according to example embodiments.

I. Illustrative Use Cases and Providers

The illustrative use cases described herein to which example embodiments may be applied comprise an end-to-end encrypted client to client communications session. By way of example only, and not intended to be limiting in any way, such use cases include:

1. Text based IM or Instant Messaging applications.
2. Multimedia Messaging applications (including Audio and/or Video) that are based on the Internet Protocol end-to-end.
3. Voice over IP, over various packet switched access networks.
4. Video over IP, over various packet switched access networks.
5. Conferencing of text and multi-media applications involving a group of participants.

These illustrative use cases apply equally well to various providers. By way of example, one can categorize providers into three categories:

1. Provider of the service could be an Enterprise (where the chief information officer or CIO controls the roll-out, administration, and operation of the application). Observe that an Enterprise could be a corporate or government entity.
2. Provider of the service could be an Application Provider (e.g., Skype, Googletalk, etc.) and such services are offered "over the top" across networks and types.
3. Provider of the service could be a network provider (e.g., Verizon Wireless, AT&T, Sprint, T-Mobile, Vodafone, etc.).

The illustrative scope of the problem and the solutions described in accordance with example embodiments apply equally well to all providers and in particular are agnostic to the end-to-end communication type or application.

II. End-to-End Key Management

Given an end-to-end IP session, and the desire to provide security end-to-end, multiple end-to-end key management schemes have been devised. By way of example, one can categorize most such schemes into three categories: (1) client based key transfer protocol; (2) network assisted key transfer protocol; and (3) asymmetric mutually authenticated key exchange protocol.

(1) Client based key transfer protocol. As shown in protocol 100 of FIG. 1, a client device 102-I referred to as the "initiator" (i.e., the client that initiates a particular communication session) uses an existing hop-by-hop secure messaging scheme that is applicable to secure signaling to transfer a "security key" to a client device 102-R referred to as the "responder" (i.e., the client that responds to the initiator of the particular communication session) across one or more network elements 104-1, 104-2. Then, end-points in the communication session, i.e., initiator and responder, use that key (or a derivation thereof) to secure that session. The example shown in FIG. 1 is based on the Session Description Protocol (SDP) which is a protocol used to negotiate a key for the Secure Real-time Transport Protocol, see, e.g., Session Description Protocol (SDP) Internet Engineering Task Force (IETF) Request for Comment (RFC) 4568, "Security Descriptions for Media Streams," July 2006, the disclosure of which is incorporated by reference herein in its entirety. In such a case, client 102-I sends an SDP offer that includes a security key across the network (end-to-end) to client 102-R, and client 102-R responds with an SDP answer that also includes a security key, thereby establishing a pair of security keys used to secure the communications associated with that particular session. It is easy to see that all parties involved in transferring the security keys while setting the session have full access to the key, and therefore are aware of the secrets of the session between two clients.

Figure 2:
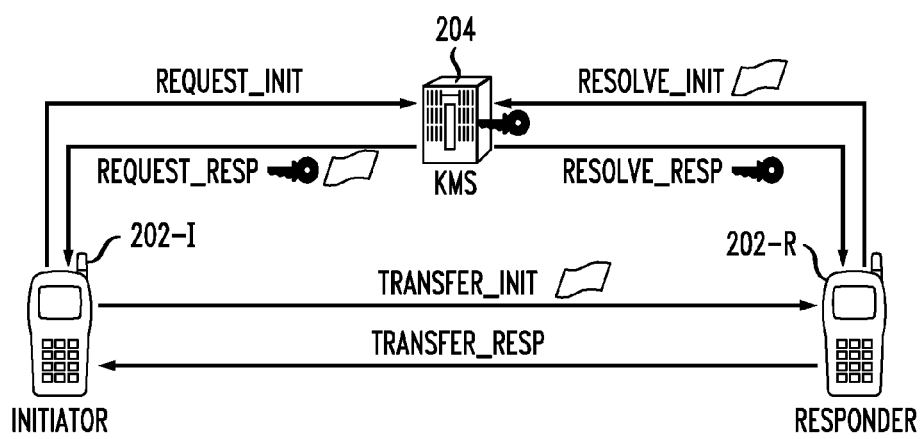
FIG. 2 illustrates a network assisted key transfer methodology.

(2) Network assisted key transfer protocol. As shown in protocol 200 of FIG. 2, client device 202-I (initiator) requests a key for the given session from a server 204 (key management server or KMS) in the provider network (or datacenter), followed by the delivery of the key and a "pointer" to the key (in the form of a ticket or token) from the server 204 to the initiator. The initiator then shares the "pointer" with client device 202-R (responder) using an existing hop-by-hop secure messaging scheme that is applicable to secure signaling, following which the responder obtains the key from the server 204 by presenting the "pointer" thereto. Two examples of such a network assisted protocol include the Kerberos system described in IETF RFC 4120, "Kerberos Network Authentication Service," July 2005, and the MIKEY-Ticket system described in IETF RFC 6043, "Ticket-based Modes of Key Distribution in Multimedia Internet Keying," March 2011, the disclosures of which are incorporated by reference herein in their entireties. It will be appreciated that the KMS has full knowledge of the security key, and therefore is aware of the secrets of the session between two clients.

Figure 3:
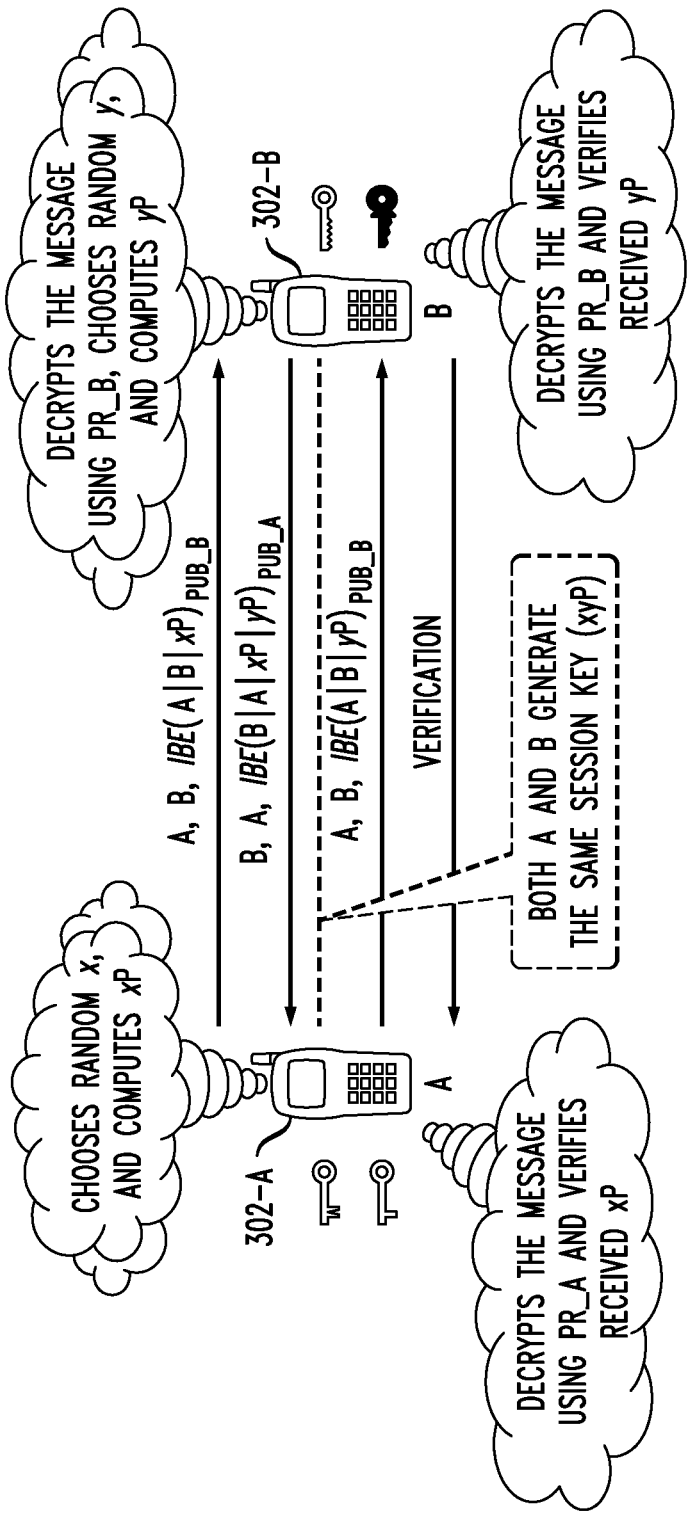
FIG. 3 illustrates an identity based authenticated key exchange methodology.

(3) Authenticated key exchange using asymmetric public key protocol. In this type of protocol, the initiator and responder each possess a pair of keys (private and public). Typical examples involve the use of their private keys to authenticate but public keys to address each other, along with public key methods for key exchange. Protocol 300 of FIG. 3 shows the IBAKE (identity based authenticated key exchange) protocol and the use of asymmetric public key methods. The IBAKE protocol is described in the U.S. patent application identified by Ser. No. 12/372,242, filed on Feb. 17, 2009, the disclosure of which is incorporated by reference herein in its entirety.

As shown in protocol 300 of FIG. 3, the IBAKE protocol defines mutual authentication and key exchange between two end-points: initiator A (client 302-A) and responder B (client 302-B). Both the initiator and the responder each have a pair of keys, i.e., their public and private keys, respectively. As is the case with public key cryptography, the public key is used for encryption and the private key is used for decryption. A fundamental difference between standard public key methods and identity based public key methods is that, in the latter, the public key corresponds to the "identity" and the corresponding private key is generated by a trusted server (called the Key Management Server or KMS).

The main concept of the illustrated protocol is that the initiator and responder authenticate each other and generate a session key using the private keys provided by the Key Management Server (not shown) and generate a session key using exchanged key components, but yet the server cannot determine the session key.

Observe in FIG. 3 that the initiator A chooses a random secret "x" and computes the value "xP" (where P is a point on an Elliptic Curve over a finite field) before sending "xP" over to the responder B. Similarly, the responder chooses a random secret "y" and computes the value "yP" before sending "yP" over to the initiator A. Using "x" and "yP," the initiator computes "xyP." Similarly, using "y" and "xP," the responder computes "xyP." This allows both parties to agree on a key for the communication session. However, the Key Management Server (KMS) has access to "xP" and "yP" but cannot compute "xyP."

It is realized that, in all of the above enumerated (three) key transfer/exchange protocols, independent of the communications type or provider, there are regulatory and/or compliance requirements by which the provider may be legally required to discover and share the end-to-end security keys (referred to as "lawful discovery").

This requirement can be relatively easily satisfied for protocol types 1 and 2. In protocol type 1 (FIG. 1), the security key of interest is transported between nodes of the network with the hop-by-hop protection, and therefore is known to the network nodes involved in the transport (e.g., network elements 104-1, 104-2 of FIG. 1). In protocol type 2 (FIG. 2), the session key is generated by a server (e.g., KMS 204 of FIG. 2) and hence available to the provider.

But this lawful discovery problem is particularly challenging for protocol type 3 (FIG. 3), when the provider is only an enabler to the key management transaction but not a participant in the transaction. In short, the problem is to discover the end-to-end security key, particularly when an asymmetric public key protocol is used for end-to-end key management. Furthermore, such discovery is required to be unobtrusive and undetectable during the communications session.

III. Key Resolution in Asymmetric Public Key Protocols

This section describes existing methods of key resolution in asymmetric public key protocols for end-to-end key management.

(1) Generic Protocol Description

We specifically focus here on protocols that utilize Diffie-Hellman type key exchange (see, e.g., IETF RFC 2631, "Diffie-Hellman Key Agreement Method," June 1999, the disclosure of which is incorporated by reference herein in its entirety). We describe the protocol as was described classically by Diffie and Hellman in their landmark paper (W. Diffie, M. Hellman, "New Directions in Cryptography," IEEE Transactions on Information Theory, vol. IT-22, November 1976, pp: 644-654, the disclosure of which is incorporated by reference herein in its entirety) over the multiplicative group of a finite field modulo a prime number p. However, it is well known that the Diffie-Hellman protocol can be extended to any group, but the security of the protocol relies on the properties of the group.

In this protocol, each of two end-points (A and B) selects publicly known values for G (Generator) and P (large Prime number) such that G is a generator of the multiplicative group of nonzero integers modulo the large prime P.

To execute the protocol, A chooses a random secret x and computes a=G^x(mod P). Similarly, B chooses a random secret y and computes b=G^y(mod P). It is to be appreciated that the secrets x and y are random positive integers less than P.

A then sends the value a to B, and B sends the value b to A.

Upon receiving value b, A computes k=b*x (mod P), similarly, upon receiving value a, B computes k=a*y (mod P). It is easy to see that k=(a)*y (mod P)=(b)*x (mod P), and k is the mutually computed common session key.

(2) Special Use of Diffie-Hellman in IBAKE

The IBAKE protocol (illustrated in FIG. 3) utilizes the group of points on an elliptic curve over a finite field, and hence relies on the corresponding Diffie-Hellman problem over the group of points in an elliptic curve over a finite field. Each end-point (e.g., A) has a known public identity, which can be used by any other end-point (e.g., B) to create the public key for A (PUB_A). Similarly, knowing the public identity of B, any other end-point can create PUB_B.

Occasionally and periodically, each end-point (e.g., A) contacts the special network-based function, Key Management Sever (KMS), and receives the specially computed private key (e.g., PR_A) computationally associated with the corresponding public key (PUB_A). Similarly, other end-points do the same. As a result, each end-point possesses the public-private key pair, while the public key is based on the end-point's identity.

To execute the protocol, each end-point chooses a random secret number. Let x be a random number chosen by A, and let y be a random number chosen by B.

In the first step, A computes xP, where P is the publicly known point on the elliptic curve E (i.e., P added to itself x times using the addition law), encrypts it using B's public key PUB_B, and transmits it to B. In this step, encryption refers to identity based encryption described in Dan Boneh, Matthew K. Franklin, "Identity-Based Encryption from the Weil Pairing" Advances in Cryptology—Proceedings of CRYPTO 2001 (2001), and in IETF RFCs 5408 and 5409, the disclosures of which are incorporated by reference herein in their entireties.

Upon receipt of the encrypted message, B decrypts the message and obtains xP.

Subsequently B computes yP, and encrypts the pair {xP, yP} using A's public key PUB_A, and then transmits it to A.

Upon receipt of this message, A decrypts the message and obtains yP. Subsequently, A encrypts yP using B's public key and sends it back to B.

Following this, both A and B compute k=xyP as the session key. To be specific, A computes k=xyP by adding received and decrypted yP to itself x times. Similarly, B computes k=yxP by adding received and decrypted xP to itself y times.

(3) Man-In-The-Middle Key Resolution for Lawful Discovery of Session Keys

A typical and well known method for key discovery for Diffie-Hellman key exchange is based on the so-called "man-in-the-middle" (MitM) method. In this method, the active intermediary C places itself in a communication link between end-points A and B. The intermediary C presents itself as B to A, and as A to B.

Intermediary C creates its own secrets, x' and y'. When C receives a from A, it responds with b'=G^y'(mod P), and similarly sends a'=G^x'(mod P) to B.

When the exchange is completed, A and C generate k1= (G^x(mod P))*y'(mod P)=(G^y'(mod P))*x) (mod P), while C and B generate k2=(G^x'(mod P))*y (mod P)=(G^y(mod P))*x' (mod P). As a result, by maintaining two independent secure sessions with A and B, the active intermediary C is able to decrypt and re-encrypt communications between A and B.

However, it is possible for some sophisticated end-point devices to exchange either an image or a signature representation of a mutually computed key, and realize that they computed in fact two different keys. This would lead to discovery of the MitM function, which is undesirable in a lawful discovery of session keys.

(4) Key Resolution by Forced Creation of Secret

Another method forces at least one of the end-points (for instance, A) to create the secret (x) which is also known to the specialized network node involved in lawful discovery of session keys. In this scheme, the end-point A does not choose a secret x, but rather waits for the network to send a special parameter such as nonce (N), and then hashes this nonce together with another secret (S) that it shares with the network. As the result, both the end-point A and the specialized network node generate x=H(S, N). Subsequently, this generated x is used as the exponent in the Diffie-Hellman exchange.

It can be easily seen that the specialized network node can compute k=(G^y(mod P))*x (mod P), and therefore becomes privy to the secret key of the communication link between A and B.

However, by expecting to receive the nonce, the end-point device is made fully aware of the presence and intentions of the network to lawfully discover the session key, which is extremely undesirable. In particular, this key discovery solution is detectable by the colluding end-point device during the communication session and furthermore works only if there is a colluding end-point device.

(5) Key Transfer to the Escrow Server

Yet another method is based on a special request that is sent to the end-point device from the network node. This request forces the end-point device to upload the computed key k or its derivative used for ciphering the A-B communications link to a network-based key escrow database. This upload is usually done under protection with the secure tunnel established between the end-point and the key escrow database.

However, the end-point device receiving such request clearly realizes the presence of the key escrow database and, therefore, possible interception of the secure communications, which for the purpose of lawful discovery of session keys is not desirable.

(6) Key Resolution by Re-generation of a "Random Secret"

In a method described in U.S. patent application Ser. No. 13/097,184, filed on Apr. 29, 2011, entitled "Discovery of Security Associations," the disclosure of which is incorporated by reference herein in its entirety, the key discovery problem relies on the provider discovering the "random secret" of at least one participant in the communications session. In particular, the method works as follows. The provider embeds a pseudo-random number generator (PRG) in the client application. The operator or application owner, e.g., enterprise, pre-configures the application with the secret random seed (S) that is associated with the client identity. This random seed is a typically a random number or, more generally, a set of numbers which includes at least one random number. This association, i.e., the seed and the identity, is stored in a server managed by the operator or application owner, e.g., enterprise. When the application needs to generate the random number for the session (e.g., x) in order to execute a key exchange protocol, such as Diffie-Hellman, IBAKE, etc., the PRG is invoked. The PRG uses the seed and a deterministic and monotonically increasing quantity, such as time stamp or externally managed counter (C), to generate the required pseudo-random value x. Once lawful interception is authorized, the intercepting entity in the network requests all necessary information from other network nodes, but not from the end-point itself. So the end-point is not aware of attempted interception. Although such method is not detectable, it involves an additional entity in the network (i.e., enterprise server) as well as specialized software in the client to generate/re-generate the "random secret."

IV. Improved Lawful Security Association Discovery

In accordance with an illustrative embodiment, a solution to the key discovery problem is provided which relies on nonces exchanged during regular message exchange between the two client devices (end-points) during a communication session. In particular, the method (which will be described in greater detail below) works as follows.

Figure 4:
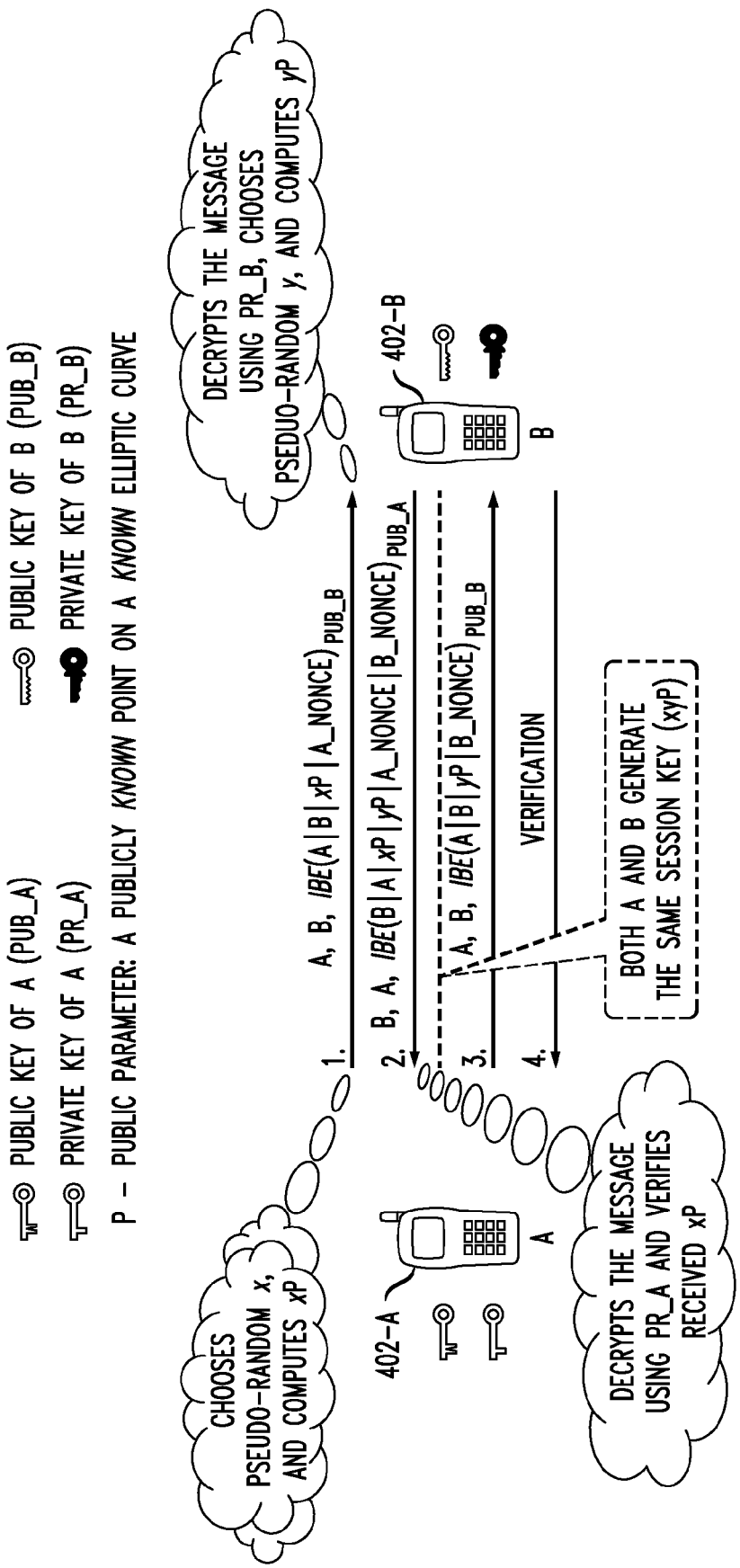
FIG. 4 illustrates a methodology for lawful discovery of session keys involving nonce exchange according to an embodiment.

As shown in the IBAKE-based protocol 400 of FIG. 4, when an end-point (e.g., 402-A) contacts the KMS (not expressly shown in FIG. 4), and receives the specially computed private key (e.g., PR_A), which is computationally associative with the corresponding public key (PUB_A), the KMS also includes the per-user root key (RK_A). This root key is known only to the KMS and the end-point user requesting the private key. As described above with regard to the IBAKE-based protocol of FIG. 3, once end-point A (here 402-A) needs to execute the protocol, end-point A chooses a random secret x. Next, end-point A generates A_Nonce using RK_A and this random secret x. In other words, in accordance with illustrative embodiments, the A_Nonce represents an encrypted value of the random secret x. One illustrative method for generating A_Nonce is as follows:

$$A\_Nonce = AES_{RK\_A}(x)$$

where AES is the Advanced Encryption Standard algorithm specified by the National Institute of Standards and Technology (NIST) in U.S. FIPS PUB 197, dated Nov. 26, 2001, the disclosure of which is incorporated by reference herein in its entirety.

End-point A (402-A) next includes this A_Nonce in the first message sent to the end-point B (message 1 in FIG. 4). Similarly, B (402-B) chooses y and generates B_Nonce ($B\_Nonce = AES_{RK\_B}(y)$) and includes both the received A_Nonce and this generated B_Nonce in the message sent to A (message 2 in FIG. 4).

Finally, end-point A (402-A) includes the received B_Nonce in the third message (message 3 in FIG. 4). Verification is performed via message 4.

It should be appreciated that for each end-point, the value of the nonce received from the corresponding end-point is not distinguishable from the random number, and therefore is treated as a nonce which requires neither processing nor recognition.

Once lawful interception is authorized, the intercepting entity (not expressly shown in FIG. 4) in the network requests all necessary information (i.e., private keys and root keys) from the KMS, unbeknownst to the end-point clients involved in the communication session. The intercepting entity then uses the received root key to obtain the random secret and then, using the obtained random secret and the exchanged remaining key component in the Diffie-Hellman exchange, the intercepting entity generates the session key.

In general, secrecy of Diffie-Hellman based protocols relies on client's knowledge of its own random secret and the value of the component generated from its own random secret by the corresponding end-point. In the example shown on FIG. 4, the end-point A (402-A) creates and keeps secret the random number x, while the end-point B (402-B) creates and keeps secret the random number y. Each of the end-points processes their respective random secret, specifically multiplying it by the value P that represents the point on Elliptic Curve. The resulting values xP and yP are exchanged through end-to-end signaling. Knowledge of both xP and yP does not help in recreating the expected session key denoted as xyP. But each end-point, knowing its own secret (x for A and y for B) can compute the expected session key. For the end-point A, the session key $k = x*yP$, and for the end-point B the key $k = y*xP$.

For example, assume in FIG. 4 that end-point B (402-B) is being a target of interception. Therefore, a law enforcement monitoring agency node (LEMF) obtains RK_B and PR_B from the KMS. Once B engages in communication, a communication network node (e.g., P/S-CSCF) intercepts and reports IMS message events to the LEMF (the intercepting server). Alternatively, the LEMF could directly intercept the IMS message events sent between the end-points without the use of the P/S-CSCF. Note that SIP refers to the Session Initiation Protocol (IETF RFC 3261, the disclosure of which is incorporated by reference in its entirety herein) and P/S-CSCF refers to either a proxy or a serving Call Session Control Function. The LEMF extracts from the intercepted IMS signaling the information related to the encryption (i.e., xP and B_Nonce) and using this extracted information and RK_B and PR_B, LEMF decrypts the messages and generates the session key $k = xyP$.

Specifically in this example, the LEMF will process the message 1 (FIG. 4) of the exchange. Knowing the private key of the end-point B (PR_B), the LEMF will decrypt the IBE-encrypted payload, which was originally encrypted by the end-point A with the public key of B (PUB_B). The LEMF will obtain the xP value from this payload. Then, the LEMF will process the message 3 (FIG. 4) of the exchange. Knowing the PR_B, the LEMF will decrypt the IBE-encrypted payload, which was originally encrypted by the end-point A with the public key of B (PUB_B). The LEMF will obtain the B_Nonce value from this payload. Then, the LEMF will decrypt the B_Nonce value using the known RK_B, and obtain the value y. Finally, knowing xP and y, the LEMF with generate the session key as $k = y*xP$.

In another example, assuming that the end-point A (402-A) is the target of interception, the LEMF obtains the RK_A and PR_A in addition to the PUB_A from the KMS. The LEMF will process the message 2 (FIG. 4) of the exchange. Knowing the private key of the end-point A (PR_A), the LEMF will decrypt the IBE-encrypted payload, which was originally encrypted by the end-point B with the public key of A (PUB_A). The LEMF will obtain the yP value from this payload. Then, the LEMF will obtain the A_Nonce value from this payload and decrypt the A_Nonce value using the known RK_A, thus obtaining the value x. Finally, knowing yP and x, the LEMF with generate the session key as $k = x*yP$.

Observe that the LEMF requests all necessary information from other network nodes, but not from the end-point itself. So, the end-point is not aware of the attempted interception. Also, this information exchange (where intercepting entity obtains information from KMS) can be performed any time before the actual start of the communication session. This dramatically reduces the complexity related to the coordination required between network elements.

Figure 5:
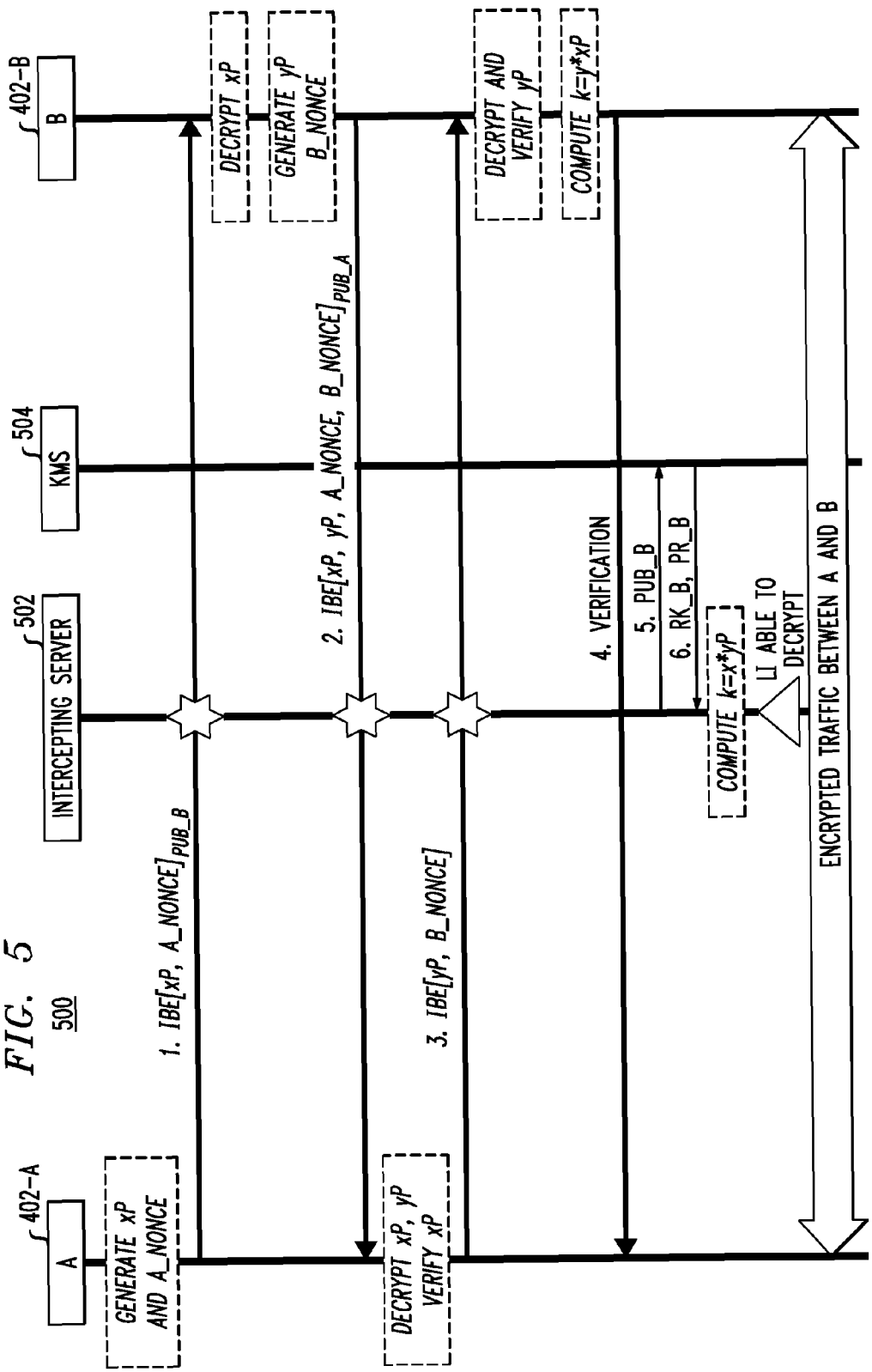
FIG. 5 illustrates a call flow for lawful discovery of session keys involving nonce exchange according to an embodiment.

Referring now to FIG. 5, an illustrative call flow is shown for lawful discovery of session keys involving nonce exchange according to the IBAKE-based embodiment of FIG. 4. Note that, for ease of understanding and consistency, the end-point elements (402-A and 402-B) in the call flow are numbered with the same reference numerals as shown in FIG. 4, and the intercepting entity is depicted as intercepting server 502 and the KMS as KMS server 504. Also note that the lawful security association discovery techniques described herein are not limited to use with any particular protocol and, thus, the IBAKE-based protocol in this embodiment is used for exemplary purposes.

As shown in FIG. 5, steps 1, 2, and 3 represent typical IBAKE protocol exchange between end-point A (402-A) and B (402-B), as described above in the context of FIG. 3. Step 4 is a verification message. If either A or B are targeted for lawful interception, the intercepting server 502 monitors and records these signaling transactions.

In steps 5 and 6 of FIG. 5, the intercepting server 502 (which would be the LEMF described above in the description of FIG. 4) requests the private key (or keys) and the root key for the target of interception (e.g., B) from the KMS 504. This transaction can be done much in advance of the actual IBAKE event. In such case, the private key(s) and the root key of the target are already available at the intercepting server 502 when A and B start communicating.

Alternatively, the intercepting server 502 provides the copy of the messages between the end-points, in their entirety, to the KMS, and expects the KMS, having knowledge of all required secret parameters for the targeted end-point, to use the same technique to derive the session key and return it to the LEMF.

Accordingly, as compared to the method described in the above-referenced U.S. patent application Ser. No. 13/097, 184, the inventive nonce-based solution described in the context of FIGS. 4 and 5 advantageously does not involve an enterprise server, nor does it involve specialized software in the client to generate/re-generate the "random secret."

Thus, to summarize what is described in detail herein, in the IBAKE protocol described above in FIG. 3, when the first client (end-point) receives yP from the second client (end-point), it does not need to know y. The first client only needs to multiply the received yP by x that the first client knows and keeps secret. The same is true for the second client, i.e., when second client receives xP, it only needs to multiply xP by y which it knows and keeps secret. The result of this multiplication on both sides is xyP, which is the session key (also referred to as a security association).

That is, in the IBAKE protocol, xP and yP are exchanged in both directions under IBE encryption. The first client encrypts xP using the public key of the second client. Only the second client can decrypt it, because only the second client has the private key corresponding to its publicized public key. Similarly, the key component yP is sent by the second client to the first client using IBE encryption with the public key of the first client. Only the first client can decrypt it, because it has the private key corresponding to its publicized public key. When the two clients return the received key components to one another, they implicitly authenticate their peers.

Advantageously, illustrative embodiments as described herein provide for the utilization of nonces in the IBAKE protocol (as shown in FIGS. 4 and 5). That is, when the first client sends its key component xP to the second client, it also sends the encrypted value of the random secret x. This is what is referred to above as A_NONCE. Similarly, when the second client sends its key component yP to the first client, it accompanies it with the encrypted value of its own random secret y, or B_Nonce. In other words, in the inventive protocol, the encrypted value of the random secret accompanies the key component based on this random secret, and this combination is always IBE encrypted by using the public key of the corresponding peer.

Thus, in order to recover the session key, the interceptor goes through two levels of protection: (1) obtain the private key of the target in order to decrypt the "keying capsule" containing the key component and associated nonce, as well as to receive the other key component from corresponding node; and (2) decrypt the nonce associated with the random secret of the target, i.e., recover the random secret itself. Having the random secret or the target and the key component of the other corresponding client, the interceptor can duplicate the session key.

We turn now to a group setting such as a conference calling environment. In conference calling, a group of participants exchange key material and agree on a group key. In particular, Diffie-Hellman key exchange has been extended to a group setting (see, e.g., Burmester and Desmedt, "A secure and efficient conference key distribution system," Proceedings of Eurocrypt '94, vol. 950 of LNCS, pages 275-286, Springer 1995, the disclosure of which is incorporated by reference herein in its entirety), and furthermore IBAKE has been extended to address authenticated key exchange in a group setting (see, e.g., U.S. patent application identified by Ser. No. 12/549,907, filed on Aug. 28, 2009, the disclosure of which is incorporated by reference herein in its entirety). Observe that the phrase "group setting," in this example, refers to a group of users greater than two, and the protocols allow all users to exchange information in an insecure environment and to exchange a "group key" as applicable, but not limited to, conferencing systems.

FIG. 6 illustrates a methodology 600 for lawful discovery of session keys involving nonce exchange in a conference calling environment according to an embodiment. In particular, FIG. 6 illustrates group key exchange using IBAKE. In this setting, a central coordinating server 604 (called the conference security server or conference server) authenticates and authorizes each user (devices 602-1 through 602-N) to participate in the group key exchange. However, the group key resulting from IBAKE computations is not known to the central coordinating server 604. But yet, due to compliance and other regulatory requirements, the conference provider is often required to discover the group key.

As illustrated, each user individually executes IBAKE with the conference server. This allows the server to ensure that only authenticated and authorized participants are allowed in the call. Following this, the server shares the Diffie-Hellman key components with everyone in the call thereby allowing each participant to calculate an additional key component and share with the rest of the participants (through the server). Using elementary group theory, it can be easily observed that all participants can calculate the same group key but the conference server will be unable to determine the key. The protocol is depicted as 606 in FIG. 6.

Nonce-based lawful key discovery techniques, as described above, can be extended in a straightforward manner to this setting as well. In accordance with such an implementation, it is to be appreciated that nonces associated with the participants are generated as explained herein and accompany the key components generated and transmitted by the participants.

Thus, at the beginning of the conference calling setup, each participant exchanges the IBAKE signaling with the conference server 604. The LEMF intercepts this signaling between the target and the conference server and decrypts the random secret sent by the target. In the second phase, when the key components are exchanged with the conference server, the LEMF can completely duplicate all computations done by the target itself. As the result, the LEMF reproduces an exact copy of the conference session key. Similarly, if the LEMF simply forwards all signaling to the KMS, the KMS conducts the computations, and returns the session key to the LEMF.

V. Illustrative Computing System

FIG. 7 illustrates a generalized hardware architecture 700 of a network environment and communication devices in the form of computing devices suitable for implementing a nonce-based secure key management protocol between two entities and lawful security association discovery according to example embodiments.

While FIG. 7 shows detailed subcomponents for only two of the illustrated entities, it is to be understood that other entities can have the same configuration. Thus, in terms of the secure key management protocols and lawful security association discovery described above, the two entities shown in detail may be initiator client device 402-A (a first party or A) and responder client device 402-B (a second party or B). However, intercepting servers (502), KMS (504), functional elements, additional client devices (parties) and additional servers may be implemented with the same architecture as shown in a computing device of FIG. 7. Thus, by way of example, intercepting server 720 and KMS 722 are shown in FIG. 7, and are understood to have the same computing architecture as that shown in devices 702 and 704. However, it is to be understood that, for the sake of simplicity, all the computing devices (communication devices) that may participate in the protocols described herein are not shown in FIG. 7. Also, in a conference calling implementation, the conference participants (devices 602-1 through 602-N) and the conference server (604) may be implemented with the same architecture as shown in a computing device of FIG. 7.

As shown, A's computing device designated 702 and B's computing device designated 704 are coupled via a network 706. The network may be any network across which the devices are able to communicate, for example, as in the embodiments described above, the network 706 could include a publicly-accessible wide area communication network such as a cellular communication network operated by a network operator (e.g., Verizon, AT&T, Sprint). However, embodiments are not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. Recall also that, as explained above, a client could also be an application on a computing device (e.g., a smartphone). However, one or more of the devices could be servers (e.g., intercepting server, KMS server, etc.). Thus, it is to be understood that the protocols and methodologies described herein are not limited to the case where the computing systems are client and server, respectively, but instead is applicable to any computing devices comprising the two network elements.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given the present disclosure, one skilled in the art could readily produce appropriate computer program code in order to implement the protocols described herein.

Nonetheless, FIG. 7 generally illustrates an exemplary architecture for each computer system communicating over the network. As shown, device 702 comprises I/O devices 708-A, processor 710-A, and memory 712-A. Device 704 comprises I/O devices 708-B, processor 710-B, and memory 702-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). Also, memory is one example of a computer readable storage medium. In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies described herein may be stored in one or more of the associated memory devices, e.g., ROM, fixed or removable memory, and, when ready to be utilized, loaded into RAM and executed by the CPU.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for forming a discoverable security association between a first computing device and a second computing device, comprising:
   obtaining by the first computing device from a key management entity: (i) a first private key assigned to the first computing device, which is computationally associative with a first public key associated with the first computing device; and (ii) a first root key assigned to the first computing device;
   choosing by the first computing device a first random value;
   encrypting by the first computing device the first random value using the first root key to generate a first nonce;
   generating by the first computing device a first key component based on the first random value;
   encrypting by the first computing device the first nonce and the first key component with a second public key associated with the second computing device using an identity-based encryption process; and
   sending by the first computing device the encrypted first nonce and the encrypted first key component to the second computing device so as to establish a security association with the second computing device, wherein the security association is discoverable by a third computing device unbeknownst to the first computing device and the second computing device.

2. The method of claim 1, further comprising the first computing device receiving in return from the second computing device, the first nonce, a second nonce, the first key component and a second key component, wherein the first nonce, the second nonce, the first key component and the second key component are encrypted with the first public key associated with the first computing device using the identity-based encryption process, and wherein the second nonce and the second key component are generated at the second computing device.

3. The method of claim 2, wherein the second nonce is a result of an encryption of a second random value chosen by the second computing device, wherein the encryption uses a second root key to encrypt the second random value, the second root key having been obtained by the second computing device from a key management entity which assigned the second root key to the second computing device.

4. The method of claim 3, wherein the second key component is generated by the second computing device based on the second random value.

5. The method of claim 2, further comprising the first computing device sending back to the second computing device the second nonce and the second key component, wherein the second nonce and the second key component are encrypted with the second public key associated with the second computing device using the identity-based encryption process.

6. The method of claim 5, wherein the first computing device and the second computing device compute the same session key for use in subsequent communications there between.

7. The method of claim 6, wherein the session key represents at least part of the security association discoverable by the third computing device.

8. The method of claim 1, wherein the first computing device and the second computing device respectively comprise clients.

9. The method of claim 1, wherein the third computing device comprises an intercepting server.

10. The method of claim 1, wherein the third computing device comprises a key management server.

11. The method of claim 1, wherein the first computing device comprises a conference call participant and the second computing device comprises a conference server.

12. A method for discovering a security association formed between a first computing device and a second computing device, comprising:
    obtaining by a third computing device one or more messages transmitted between the first computing device and the second computing device;
    decrypting by the third computing device at least one of the one or more obtained messages from the first computing device and obtaining by the first computing(i) a first key component generated by the first computing device; and (ii) a nonce generated by the second computing device, the third computing device having knowledge of a private key associated with the second computing device, and the nonce being generated by the second computing device by encrypting a random value chosen by the second computing device using a root key uniquely assigned to the second computing device;
    decrypting by the third computing device the nonce to obtain the random value chosen by the second computing device, the third computing device having knowledge of the root key of the second computing device; and
    discovering by the third computing device a security association established between the first computing device and the second computing device unbeknownst to the first computing device and the second computing device, the third computing device having knowledge of the random value chosen by the second computing device and the first key component generated by the first computing device.

13. The method of claim 12, wherein the third computing device comprises an intercepting server.

14. The method of claim 13, wherein the intercepting server is associated with a law enforcement monitoring agency.

15. The method of claim 12, wherein the third computing device comprises a key management server.

16. The method of claim 15, wherein the key management server obtains the one or more messages transmitted between the first computing device and the second computing device from an intercepting server, and returns the discovered security association established between the first computing device and the second computing device to the intercepting server.

17. The method of claim 12, wherein the discovered security association established between the first computing device and the second computing device comprises a session key.

18. The method of claim 12, wherein the first computing device and the second computing device respectively comprise clients.

19. The method of claim 12, wherein the first computing device comprises a conference call participant and the second computing device comprises a conference server.

20. An apparatus for forming a discoverable security association between a first computing device and a second computing device, comprising:
    a memory; and
    a processor coupled to the memory and configured to cause the first computing device to:
        obtain from a key management entity: (i) a first private key assigned to the first computing device, which is computationally associative with a first public key associated with the first computing device; and (ii) a first root key assigned to the first computing device;
        choose a first random value;
        encrypt the first random value using the first root key to generate a first nonce;
        generate a first key component based on the first random value;
        encrypt the first nonce and the first key component with a second public key associated with the second computing device using an identity-based encryption process; and
        send the encrypted first nonce and the encrypted first key component to the second computing device so as to establish a security association with the second computing device, wherein the security association is discoverable by a third computing device unbeknownst to the first computing device and the second computing device.

21. The apparatus of claim 20, wherein the processor further causes the first computing device to receive in return from the second computing device, the first nonce, a second nonce, the first key component and a second key component, wherein the first nonce, the second nonce, the first key component and the second key component are encrypted with the first public key associated with the first computing device using the identity-based encryption process, and wherein the second nonce and the second key component are generated at the second computing device.

22. The apparatus of claim 21, wherein the second nonce is a result of an encryption of a second random value chosen by the second computing device, wherein the encryption uses a second root key to encrypt the second random value, the second root key having been obtained by the second computing device from a key management entity which assigned the second root key to the second computing device.

23. The apparatus of claim 22, wherein the second key component is generated by the second computing device based on the second random value.

24. The apparatus of claim 21, wherein the processor further causes the first computing device to send back to the second computing device the second nonce and the second key component, wherein the second nonce and the second key component are encrypted with the second public key associated with the second computing device using the identity-based encryption process.

25. The apparatus of claim 24, wherein the first computing device and the second compute device compute the same session key for use in subsequent communications there between.

26. An apparatus for discovering a security association formed between a first computing device and a second computing device, comprising:

a memory; and a processor coupled to the memory and configured to cause a third computing device to:

obtain one or more messages transmitted between the first computing device and the second computing device;

decrypt at least one of the one or more obtained messages from the first computing device and obtain: (i) a first key component generated by the first computing device; and (ii) a nonce generated by the second computing device, the third computing device having knowledge of a private key associated with the second computing device, and the nonce being generated by the second computing device by encrypting a random value chosen by the second computing device using a root key uniquely assigned to the second computing device;

decrypt the nonce to obtain the random value chosen by the second computing device, the third computing device having knowledge of the root key of the second computing device; and discover a security association established between the first computing device and the second computing device unbeknownst to the first computing device and to second computing device, the third computing device having knowledge of the random value chosen by the second computing device and the first key component generated by the first computing device.

\* \* \* \* \*

UNITED STATES PATENT AND TRADEMARK OFFICE
CERTIFICATE OF CORRECTION

| | |
|---|---|
| PATENT NO. | : 8,644,510 B2 |
| APPLICATION NO. | : 13/173079 |
| DATED | : February 4, 2014 |
| INVENTOR(S) | : Violeta Cakulev et al. |

It is certified that error appears in the above-identified patent and that said Letters Patent is hereby corrected as shown below:

In the claims:

Claim 12, col. 15, line 47, please delete "computing (i)" and insert --computing device: (i)--.

Claim 26, col. 18, line 17, please delete "to second" and insert --the second--.

Signed and Sealed this
Twentieth Day of May, 2014

Michelle K. Lee
*Deputy Director of the United States Patent and Trademark Office*